(12) United States Patent
Shibata

(10) Patent No.: US 12,504,934 B2
(45) Date of Patent: Dec. 23, 2025

(54) INSPECTION APPARATUS AND CONTROL METHOD OF INSPECTION APPARATUS FOR DETECTING AN IMAGE DEFECT BASED ON IMAGE DATA

(71) Applicant: CANON KABUSHIKI KAISHA, Tokyo (JP)

(72) Inventor: Daisuke Shibata, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/596,112

(22) Filed: Mar. 5, 2024

(65) Prior Publication Data

US 2024/0248658 A1 Jul. 25, 2024

Related U.S. Application Data

(63) Continuation of application No. 18/343,663, filed on Jun. 28, 2023, now Pat. No. 11,954,382.

(30) Foreign Application Priority Data

Jun. 30, 2022 (JP) .................................. 2022-105514
May 16, 2023 (JP) .................................. 2023-080511

(51) Int. Cl.
G06F 3/12 (2006.01)
G06T 7/00 (2017.01)

(52) U.S. Cl.
CPC .......... *G06F 3/1234* (2013.01); *G06F 3/1208* (2013.01); *G06F 3/121* (2013.01); *G06T 7/0004* (2013.01); *G06T 2207/30144* (2013.01)

(58) Field of Classification Search
None
See application file for complete search history.

(56) References Cited

U.S. PATENT DOCUMENTS

2020/0051231 A1* 2/2020 Tsukamoto ........ H04N 1/00063
2020/0301336 A1* 9/2020 Tsuchiya .............. G03G 15/553

FOREIGN PATENT DOCUMENTS

JP 2017034298 A 2/2017
JP 2018004690 A 1/2018

* cited by examiner

*Primary Examiner* — Lennin R Rodriguezgonzalez
(74) *Attorney, Agent, or Firm* — Canon U.S.A., Inc. IP Division

(57) ABSTRACT

On the basis of determination by image inspection that an image defect is generated and a predetermined condition being satisfied, an instruction unit for issuing an image diagnosis instruction is displayed on a screen of an inspection result, and image diagnosis is executed in response to an operation on the instruction unit.

19 Claims, 12 Drawing Sheets

FIG.4A

INSPECTION RESULT LIST SCREEN

| JOB NAME | STATUS | INSPECTION START TIME | INSPECTION END TIME | NUMBER OF INSPECTED SHEETS | NUMBER OF FAILED SHEETS | SETTING CONFIRMATION | RESULT CONFIRMATION | DIAGNOSIS |
|---|---|---|---|---|---|---|---|---|
| COMPANY A CATALOG | SET | — | — | | | SETTING CONFIRMATION | | |
| COMPANY B FLYER ADDITION | SET | — | — | | | SETTING CONFIRMATION | | |
| COMPANY A BROCHURE FINAL VERSION | INSPECTED | 2022/5/25 10:26 | 2022/5/25 10:35 | 200 | 0 | SETTING CONFIRMATION | RESULT CONFIRMATION | |
| COMPANY B FLYER | INSPECTED | 2022/5/24 15:02 | 2022/5/25 15:06 | 80 | 8 | SETTING CONFIRMATION | RESULT CONFIRMATION | IMAGE DIAGNOSIS |
| COMPANY B MANUAL TO BE CONFIRMED | INSPECTED | 2022/4/15 18:00 | 2022/4/15 18:02 | 21 | 2 | SETTING CONFIRMATION | RESULT CONFIRMATION | IMAGE DIAGNOSIS |
| COMPANY A CATALOG | INSPECTED | 2022/4/15 16:42 | 2022/4/14 16:45 | 35 | 0 | SETTING CONFIRMATION | RESULT CONFIRMATION | |

1400
1401
1402 ENVIRONMENTAL SETTING
1403 EXECUTE IMAGE DIAGNOSIS

FIG. 4B

INSPECTION RESULT CONFIRMATION SCREEN — I410

I411

| INSPECTED: | FAILED: | FAILURE PERCENTAGE: | ERROR: |
|---|---|---|---|
| 80 PAGES | 2 PAGES | 2.5 % | 0 PAGES |

I412

| POSITIONAL SHIFT (VERTICAL): | POSITIONAL SHIFT (HORIZONTAL): | DIRT (POINT): | DIRT (STREAK): |
|---|---|---|---|
| 0 PAGES | 0 PAGES | 0 PAGES | 2 PAGES |

I413

| NO. | PAGE NO. | SET NO. | SURFACE NO. | POSITIONAL SHIFT (VERTICAL) | POSITIONAL SHIFT (HORIZONTAL) | DIRT (POINT) | DIRT (STREAK) | ERROR | INSPECTION DATE AND TIME | FAILED IMAGE |
|---|---|---|---|---|---|---|---|---|---|---|
| 72 | 2 | 15 | 1 | PASSED | PASSED | PASSED | FAILED | — | 2022/5/24 15:04 | CONFIRM |
| 78 | 3 | 16 | 1 | PASSED | PASSED | PASSED | FAILED | — | 2022/5/24 15:05 | CONFIRM |

I414 — EXECUTE IMAGE DIAGNOSIS

I415 — CLOSE

FIRST SIDE

SECOND SIDE

SHEET BEING DISPLAYED: SHEET 1 OF 2

FIG.5B

IMAGE DIAGNOSIS NECESSITY DETERMINATION ITEM SETTING — I510

IMAGE DIAGNOSIS NECESSITY DETERMINATION ITEM SETTING

| I511 POSITIONAL SHIFT | I512 DIRT (STREAK) | I513 DIRT (POINT) |
|---|---|---|
| ☑ DIAGNOSE | ☑ DIAGNOSE | ☑ DIAGNOSE |
| NOT DIAGNOSE | NOT DIAGNOSE | NOT DIAGNOSE |
| TARGET COLOR | TARGET COLOR | TARGET COLOR |
| ☑ Y | ☑ Y | ☑ Y |
| ☑ M | ☑ M | ☑ M |
| ☑ C | ☑ C | ☑ C |
| ☑ K | ☑ K | ☑ K |

I514 OK    I515 CANCEL

FIG.6A
IMAGE DIAGNOSIS SETTING SCREEN — I600

IMAGE DIAGNOSIS SETTING

| POSITIONAL SHIFT (I601) | DIRT (STREAK) (I602) | DIRT (POINT) (I603) |
|---|---|---|
| ☑ DIAGNOSE | ☑ DIAGNOSE | ☑ DIAGNOSE |
| ☐ NOT DIAGNOSE | ☐ NOT DIAGNOSE | ☐ NOT DIAGNOSE |
| TARGET COLOR | TARGET COLOR | TARGET COLOR |
| ☑ Y | ☑ Y | ☑ Y |
| ☑ M | ☑ M | ☑ M |
| ☑ C | ☑ C | ☑ C |
| ☑ K | ☑ K | ☑ K |

- I604: SHEET SETTING — TRAY 1: A4
- I605: EXECUTE IMAGE DIAGNOSIS
- I606: CLOSE

FIG.6B
IMAGE DIAGNOSIS RESULT (NORMAL) — I610

IMAGE DIAGNOSIS RESULT

I611 — DIAGNOSIS DATE AND TIME: 2022/05/25 08:31

DIAGNOSIS ITEM/RESULT (I612)

POSITIONAL SHIFT
  VERTICAL: NORMAL
  HORIZONTAL: NORMAL
DIRT (STREAK)
  VERTICAL STREAK: NORMAL
  HORIZONTAL STREAK: NORMAL
DIRT (POINT)
  WHITE POINT: NORMAL
  COLORED POINT: NORMAL
  BLACK SPOT: NORMAL
  WHITE SPOT: NORMAL

I613:
DIAGNOSIS RESULT:
CONFIRMED THAT IMAGE CAN BE NORMALLY OUTPUT.

I614: CLOSE

FIG.6C
IMAGE DIAGNOSIS RESULT (AUTOMATIC CORRECTION) I620

I611        IMAGE DIAGNOSIS RESULT

DIAGNOSIS DATE AND TIME: 2022/05/24 10:12    I613

DIAGNOSIS ITEM/RESULT

POSITIONAL SHIFT
   VERTICAL:     AUTOMATICALLY CORRECTED
   HORIZONTAL:     AUTOMATICALLY CORRECTED
DIRT (STREAK)
   VERTICAL STREAK:   NORMAL
   HORIZONTAL STREAK: NORMAL
DIRT (POINT)
   WHITE POINT:    —
   COLORED POINT:    —
   BLACK SPOT:    —
   WHITE SPOT:    —

DIAGNOSIS RESULT:
DETECTED POSITIONAL SHIFT (VERTICAL/HORIZONTAL) IS AUTOMATICALLY CORRECTED.

· REGISTRATION ADJUSTMENT

I612    I614 CLOSE

FIG.6D
IMAGE DIAGNOSIS RESULT (ABNORMAL) I630

I611        IMAGE DIAGNOSIS RESULT

DIAGNOSIS DATE AND TIME: 2022/05/25 16:48    I613

DIAGNOSIS ITEM/RESULT

POSITIONAL SHIFT
   VERTICAL:     NORMAL
   HORIZONTAL:     NORMAL
DIRT (STREAK)
   VERTICAL STREAK:   ABNORMAL
   HORIZONTAL STREAK: NORMAL
DIRT (POINT)
   WHITE POINT:    NORMAL
   COLORED POINT:    NORMAL
   BLACK SPOT:    NORMAL
   WHITE SPOT:    NORMAL

DIAGNOSIS RESULT:
VERTICAL STREAK IS GENERATED.

CAUSE:
REPLACE FOLLOWING COMPONENT:
  DRUM UNIT (K)

I612    I614 CLOSE

INSPECTION APPARATUS AND CONTROL METHOD OF INSPECTION APPARATUS FOR DETECTING AN IMAGE DEFECT BASED ON IMAGE DATA

CROSS-REFERENCE TO RELATED APPLICATIONS

This application is a Continuation of U.S. patent application Ser. No. 18/343,663, filed Jun. 28, 2023, which claims the benefit of Japanese Patent Applications No. 2022-105514, filed Jun. 30, 2022, and No. 2023-080511, filed May 16, 2023, all of which are hereby incorporated by reference herein in their entirety.

BACKGROUND OF THE INVENTION

Field of the Invention

The present invention relates to an inspection apparatus and a control method of an inspection apparatus.

Description of the Related Art

There has been a system that can detect a print defect such as dirt or white microdots generated in printing. The system detects a print defect by reading, using a sensor, a printed matter output from an image forming apparatus, performing image processing on image data obtained by reading the printed matter, and then comparing the processed image data with print data being original data.

In some cases, such a print defect is generated due to deterioration in a component in an image forming apparatus that is attributed to longtime use of the image forming apparatus. To identify a generation factor of the print defect in such cases, there has been provided an image diagnosis function of identifying a print defect phenomenon and a generation factor by printing a dedicated chart and reading the printed chart using a sensor.

Japanese Patent Application Laid-Open No. 2021-133506 discusses stopping image formation and performing processing of identifying a print defect factor in a case where the number of consecutive errors in inspection results of printed matters is a predetermined number of times or more, and the same image defects are consecutively generated.

Nevertheless, in the technique discussed in Japanese Patent Application Laid-Open No. 2021-133506, if the same image defects are consecutively generated a predetermined number of times or more, image diagnosis processing of identifying a defect factor is always started, and it has been unable to select whether to execute the image diagnosis processing in accordance with an instruction from a user who has checked an inspection result.

SUMMARY OF THE INVENTION

According to an aspect of the present invention, an inspection apparatus connected with an image forming apparatus, the inspection apparatus includes an inspection unit configured to perform inspection to determine whether an image defect is generated in inspection target image data obtained by reading, using a reading unit, a printed matter printed on a recording sheet by the image forming apparatus based on a print job, a display control unit configured to display an instruction unit for executing image diagnosis on a screen of an inspection result obtained by the inspection unit based on determination by the inspection unit that an image defect is generated, and a diagnosis unit configured to determine whether an image defect is generated in inspection target image data obtained by reading, using the reading unit, a chart image printed on a recording sheet by the image forming apparatus in response to an operation on the instruction unit, and diagnose a defect point of the image forming apparatus based on a type of image defect generated in the image data.

According to another aspect of the present invention, an inspection apparatus includes a setting unit configured to make a setting, via an operation unit, in such a manner as to execute image diagnosis on an image in which a first image defect is generated and not to execute the image diagnosis on an image in which a second image defect is generated, an inspection unit configured to perform inspection to determine whether an image defect is generated in inspection target image data obtained by reading, using a reading unit, a printed matter printed on a recording sheet, and a control unit configured to cause the image diagnosis to be executed based on determination by the inspection unit that the first image defect is generated.

Further features of the present invention will become apparent from the following description of exemplary embodiments with reference to the attached drawings.

BRIEF DESCRIPTION OF THE DRAWINGS

FIGS. 4A and 4B are diagrams each illustrating an example of a user interface (UI) of an inspection job result screen.

FIGS. 5A and 5B are diagrams each illustrating an example of a UI of an advanced settings screen.

FIGS. 6A, 6B, 6C, and 6D are diagrams each illustrating an example of a UI of an image diagnosis result screen.

DESCRIPTION OF THE EMBODIMENTS

An exemplary embodiment of the present invention will be described in detail with reference to the attached drawings. The following exemplary embodiment is not intended to limit the invention set forth in the appended claims, and not all the combinations of features described in each exemplary embodiment are always essential to the solution of the present invention. An external controller in the present exemplary embodiment will also be sometimes referred to as an image processing controller, a digital front end (DFE), or a print server. An image forming apparatus will also be sometimes referred to as a multifunction apparatus or a multifunction peripheral (MFP).

Figure 1:
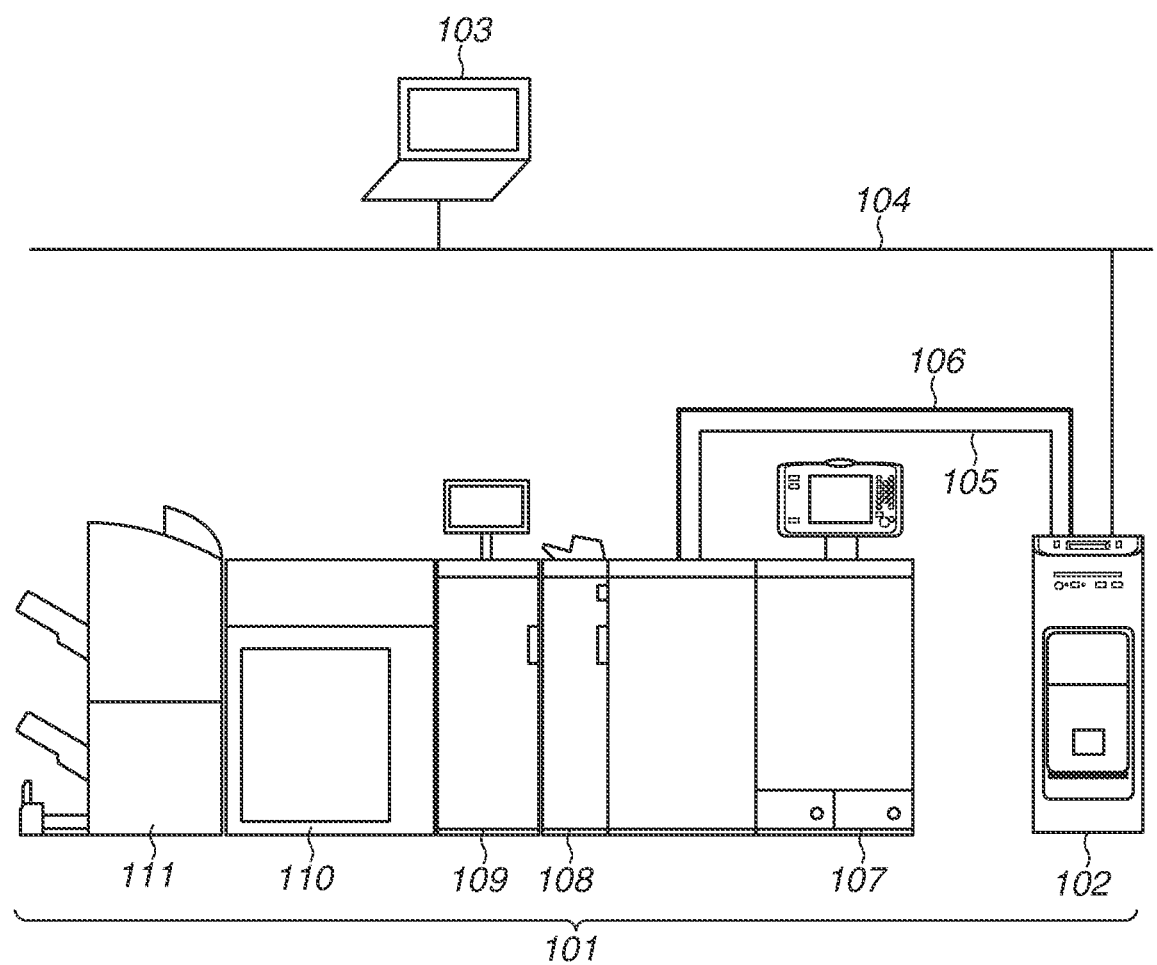
FIG. 1 is an overall view illustrating a hardware configuration of a printing system.

FIG. 1 is an overall view illustrating a hardware configuration of an image processing system (printing system) according to the present exemplary embodiment. The image processing system includes an image forming apparatus 101 and an external controller 102. The image forming apparatus 101 and the external controller 102 are connected via an internal local area network (LAN) 105 and a video cable 106 in such a manner that communication can be performed. The external controller 102 is connected with a personal computer (PC) 103 via an external LAN 104 in such a manner that communication can be performed, and a print instruction is issued from the PC 103 to the external controller 102.

A printer driver having a function of converting print data into a print description language processable by the external controller 102 is installed on the PC 103. A user who performs printing can issue a print instruction from various applications via the printer driver. The printer driver transmits the print data to the external controller 102 based on the print instruction from the user. If the external controller 102 receives the print instruction from the PC 103, the external controller 102 performs data analysis and rasterizing processing, inputs the print data to the image forming apparatus 101, and issues a print instruction. The external controller 102 inputs the print data to the image forming apparatus 101 via the internal LAN 105, and inputs rasterized image data to the image forming apparatus 101 via the video cable 106.

Next, the image forming apparatus 101 will be described. A plurality of apparatuses having different functions are connected to the image forming apparatus 101, and the image forming apparatus 101 is configured to be able to execute complicated print processing such as bookbinding.

A printing apparatus 107 forms an image using toner on a sheet conveyed from a sheet feeding unit provided in a lower part of the printing apparatus 107. The description will be given using a sheet as an example, but a medium other than a sheet may be used as long as the medium is a recording sheet of a print medium.

The configuration and the operating principle of the printing apparatus 107 will be described below. The printing apparatus 107 reflects light beams such as laser light that have been modulated based on image data, using a rotary polygon mirror, and emits the reflected light beams onto a photosensitive drum as scanning light.

An electrostatic latent image formed on the photosensitive drum by the laser light is developed with toner, and a resultant toner image is transferred onto a sheet attached to a transfer drum. By sequentially executing a series of image forming processes using yellow (Y) toner, magenta (M) toner, cyan (C) toner, and black (K) toner, the printing apparatus 107 can form a full-color image on the sheet. The sheet on the transfer drum on which the full-color image is formed is conveyed to a fixing device. The fixing device includes a roller and a belt. The roller includes a built-in heat source such as a halogen heater. The fixing device fixes toner on the sheet to which the toner image has been transferred by melting the toner by heat and pressure. An inserter 108 is an apparatus for inserting an insertion sheet. The inserter 108 can insert a sheet to a desired position among sheets conveyed after being printed by the printing apparatus 107.

An inspection apparatus 109 is an apparatus for determining whether a printed image is normal by comparing image data generated by reading an image on a conveyed sheet (printed matter) and pre-registered reference image data. Printed matters having been subjected to the determination as to whether the printed matters are normal are discharged after being sorted into normal printed matters and printed matters with errors, for example.

A large-capacity stacker 110 is an apparatus on which a large number of sheets can be stacked. A finisher 111 is an apparatus that adds finishing processing to a conveyed sheet. The finisher 111 can perform the finishing processing such as stapling, punching, and saddle stitch bookbinding based on a setting, and discharges processed sheets to a discharge tray.

The printing system described with reference to FIG. 1 has a configuration in which the external controller 102 is connected to the image forming apparatus 101, but the configuration according to the present invention is not limited to the configuration in which the external controller 102 is connected to the image forming apparatus 101.

More specifically, the printing system may have a configuration in which the image forming apparatus 101 is connected to the external LAN 104, and print data processable by the image forming apparatus 101 is transmitted from the PC 103. In this case, print processing is executed after data analysis and rasterizing processing are performed in the image forming apparatus 101.

Figure 2:
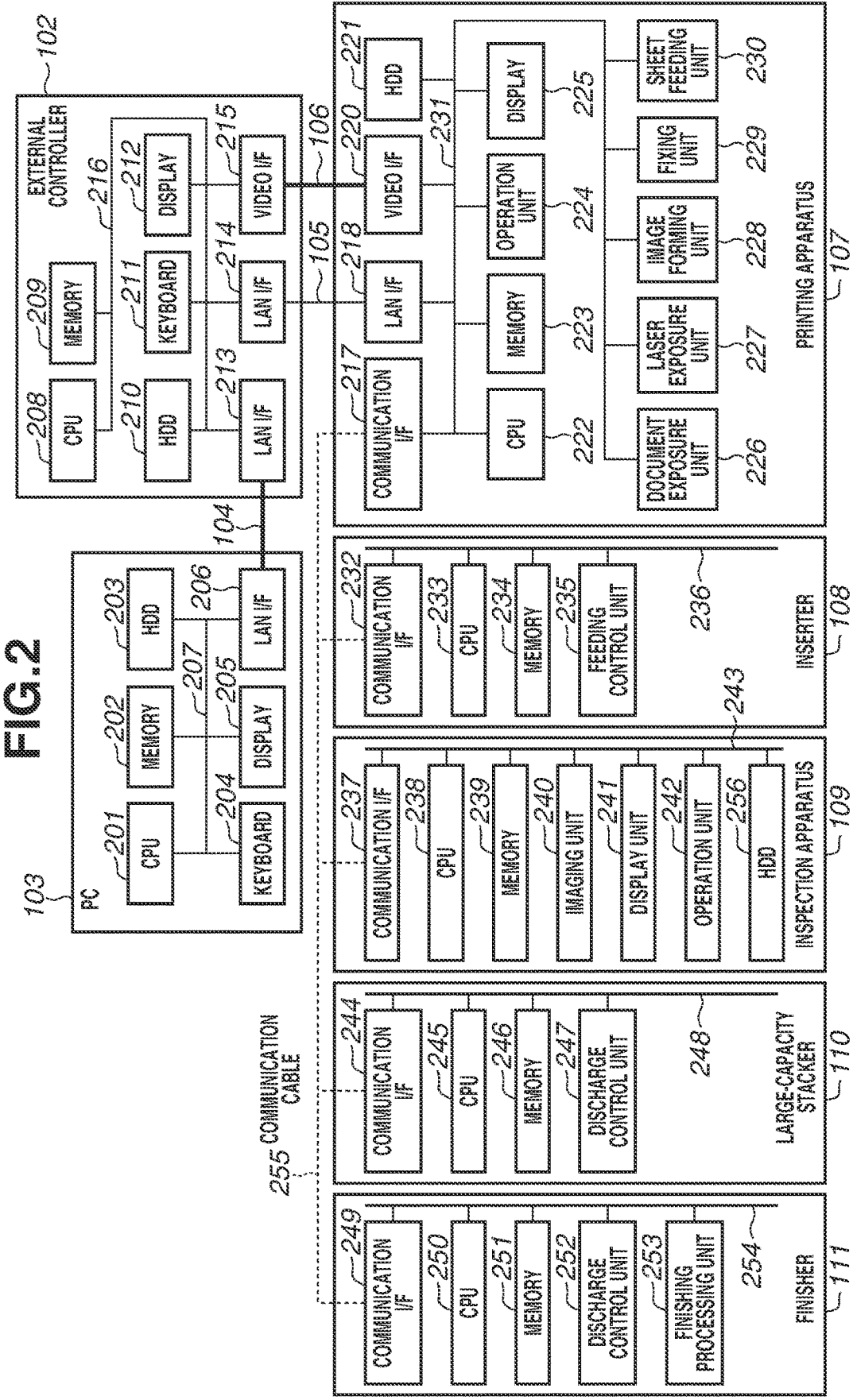
FIG. 2 is a block diagram illustrating a system configuration of the printing system.

FIG. 2 is a block diagram illustrating system configurations of the image forming apparatus 101, the external controller 102, and the PC 103.

First, the configuration of the printing apparatus 107 of the image forming apparatus 101 will be described. The printing apparatus 107 of the image forming apparatus 101 includes a communication interface (I/F) 217, a LAN I/F 218, a video I/F 220, a hard disk drive (HDD) 221, a central processing unit (CPU) 222, a memory 223, an operation unit 224, and a display 225. The printing apparatus 107 of the image forming apparatus 101 further includes a document exposure unit 226, a laser exposure unit 227, an image forming unit 228, a fixing unit 229, and a sheet feeding unit 230. The components are connected via a system bus 231.

The communication I/F 217 is connected with inserter 108, the inspection apparatus 109, the large-capacity stacker 110, and the finisher 111 via a communication cable 255, and communication for controlling these apparatuses is performed.

The LAN I/F 218 is connected with the external controller 102 via the internal LAN 105, and communication of print data is performed.

The video I/F 220 is connected with the external controller 102 via the video cable 106, and communication of rasterized image data is performed.

The HDD 221 is a storage device storing programs and data. The CPU 222 comprehensively performs image processing control and printing control based on the programs stored in the HDD 221. The memory 223 stores programs and image data that the CPU 222 uses to perform various types of processing, and operates as a work area.

The operation unit 224 receives input of various settings and operation instructions from the user. Setting information of the printing apparatus 107 and a processing status of a print job are displayed on the display 225. The document exposure unit 226 performs processing of reading a document when a copy function and a scan function are used.

The document exposure unit 226 reads document data by capturing an image using a charge-coupled device (CCD) camera while illuminating a sheet installed by the user using an exposure lamp.

The laser exposure unit 227 is a device that performs primary charging for emitting laser light onto a photosensitive drum to transfer a toner image, and laser exposure. The laser exposure unit 227 first performs the primary charging of charging a photosensitive drum surface to a uniform negative potential. Next, the laser exposure unit 227 emits laser light using a laser driver onto the photosensitive drum while adjusting a reflection angle using a polygon mirror. This neutralizes negative charge of a portion irradiated with laser light, and an electrostatic latent image is formed. The image forming unit 228 is a device for transferring toner to a sheet. The image forming unit 228 includes a development unit, a transfer unit, and a toner supply unit, and transfers toner on the photosensitive drum onto a sheet.

The development unit visualizes the electrostatic latent image on the photosensitive drum surface by causing toner charged to negative potential to adhere to the electrostatic latent image from a development cylinder. The transfer unit performs primary transfer of transferring toner on the photosensitive drum surface to a transfer belt by applying a positive potential to a primary transfer roller, and secondary transfer of transferring toner on the transfer belt to a sheet by applying a positive potential to a secondary transfer outer roller. The fixing unit 229 is a device for melting and fixing toner on a sheet to the sheet using heat and pressure, and includes a heater, a fixing belt, and a pressure belt. The sheet feeding unit 230 is a device for feeding sheets, and controls a feeding operation and a conveyance operation of sheets using a roller and various sensors.

Next, the configuration of the inserter 108 of the image forming apparatus 101 will be described. The inserter 108 of the image forming apparatus 101 includes a communication I/F 232, a CPU 233, a memory 234, and a feeding control unit 235, and the components are connected via a system bus 236. The communication I/F 232 is connected with the printing apparatus 107 via the communication cable 255, and communication necessary for control is performed. Based on a control program stored in the memory 234, the CPU 233 performs various types of control necessary for sheet feeding. The memory 234 is a storage device storing the control program. The feeding control unit 235 controls feeding and conveyance of sheets conveyed from a sheet feeding unit of the inserter 108 and the printing apparatus 107, while controlling a roller and a sensor, based on an instruction from the CPU 222.

Next, the configuration of the inspection apparatus 109 of the image forming apparatus 101 will be described. The inspection apparatus 109 of the image forming apparatus 101 includes a communication I/F 237, a CPU 238, a memory 239, an imaging unit 240, a display unit 241, an operation unit 242, and an HDD 256, and the components are connected via a system bus 243. The communication I/F 237 is connected with the printing apparatus 107 via the communication cable 255, and communication necessary for control is performed.

A reference image to be used in inspection is also received from the printing apparatus 107 via the communication cable 255 and the communication I/F 237, and stored in the HDD 256. Based on a control program stored in the memory 239, the CPU 238 performs various types of control necessary for inspection. The memory 239 is a storage device storing the control program. Receiving and storing of the reference image are not limited to this configuration. For example, a configuration in which the inspection apparatus 109 includes an internal LAN I/F and communicates with the external controller 102 via an internal LAN may be employed. At this time, by receiving a reference image from the external controller 102 via the internal LAN and storing the reference image in the HDD 256, the inspection apparatus 109 can perform a similar operation.

Based on an instruction from the CPU 238, the imaging unit 240 captures an image of a conveyed sheet. The CPU 238 determines whether a printed image is normal by comparing an image captured by the imaging unit 240 and a reference image stored in the HDD 256. An inspection result and a setting screen are displayed on the display unit 241. The operation unit 242 is operated by the user and receives an instruction to change the setting of the inspection apparatus 109 and an instruction to register a reference image. The HDD 256 stores the reference image.

In a case where the HDD 256 is not provided, a configuration in which the reference image is stored in the HDD 221 and, when processing of determining whether a printed image is normal is performed, the reference image is read from the HDD 221 into the memory 239 and is used may be employed.

Next, the configuration of the large-capacity stacker 110 of the image forming apparatus 101 will be described. The large-capacity stacker 110 of the image forming apparatus 101 includes a communication I/F 244, a CPU 245, a memory 246, and a discharge control unit 247, and the components are connected via a system bus 248. The communication I/F 244 is connected with the printing apparatus 107 via the communication cable 255, and communication necessary for control is performed. Based on a control program stored in the memory 246, the CPU 245 performs various types of control necessary for sheet discharge. The memory 246 is a storage device storing the control program. Based on an instruction from the CPU 245, the discharge control unit 247 performs control to convey a conveyed sheet to a stack tray, an escape tray, or the subsequent finisher 111.

Next, the configuration of the finisher 111 of the image forming apparatus 101 will be described. The finisher 111 of the image forming apparatus 101 includes a communication I/F 249, a CPU 250, a memory 251, a discharge control unit 252, and a finishing processing unit 253. The components are connected via a system bus 254. The communication I/F 249 is connected with the printing apparatus 107 via the communication cable 255, and communication necessary for control is performed. Based on a control program stored in the memory 251, the CPU 250 performs various types of control necessary for finishing and sheet discharge. The memory 251 is a storage device storing the control program. Based on an instruction from the CPU 250, the discharge control unit 252 controls conveyance and discharge of sheets. Based on an instruction from the CPU 250, the finishing processing unit 253 controls finishing processing such as stapling, punching, and saddle stitch bookbinding.

Next, the configuration of the external controller 102 will be described. The external controller 102 includes a CPU 208, a memory 209, an HDD 210, a keyboard 211, a display 212, a LAN I/F 213, a LAN I/F 214, and a video I/F 215, and the components are connected via a system bus 216. Based on a program and data stored in the HDD 210, the CPU 208 comprehensively executes processing such as reception of print data from the PC 103, RIP processing, and transmission of a print job to the image forming apparatus 101.

The memory 209 stores programs and data that are used when the CPU 208 performs various types of processing, and operates as a work area. The HDD 210 stores programs and data that are necessary for operations such as print processing. The keyboard 211 is a device for entering operation instructions of the external controller 102. Information regarding an application executed on the external controller 102 is displayed on the display 212 based on a video signal of a still image or a moving image. The LAN I/F 213 is connected with the PC 103 via the external LAN 104, and communication of a print instruction is performed. The LAN I/F 214 is connected with the image forming apparatus 101 via the internal LAN 105, and communication of a print job is performed as a print instruction. The video I/F 215 is connected with the image forming apparatus 101 via the video cable 106, and communication of rasterized image data is performed.

Next, the configuration of the PC 103 will be described. The PC 103 includes a CPU 201, a memory 202, an HDD 203, a keyboard 204, a display 205, and a LAN I/F 206, and the components are connected via a system bus 207. Based on a document processing program stored in the HDD 203, the CPU 201 executes print data creation and a print instruction.

The CPU 201 comprehensively controls each device connected to the system bus 207. The memory 202 stores programs and data that are used when the CPU 201 performs various types of processing, and operates as a work area. The HDD 203 stores programs and data that are necessary for operations such as print processing. The keyboard 204 is a device for entering operation instructions of the PC 103. Information regarding an application executed on the PC 103 is displayed on the display 205 based on a video signal of a still image or a moving image. The LAN I/F 206 is connected with the external LAN 104, and communication of a print instruction is performed.

In the above description, the external controller 102 and the image forming apparatus 101 are connected via the internal LAN 105 and the video cable 106, but the system only needs to have a configuration in which data necessary for printing can be transmitted and received. For example, a configuration in which the external controller 102 and the image forming apparatus 101 are connected only via the video cable 106 may be employed. The memory 202, the memory 209, the memory 223, the memory 234, the memory 239, the memory 246, and the memory 251 only need to be storage devices for storing data and programs. For example, a configuration in which each memory is replaced with a volatile random access memory (RAM), a nonvolatile read-only memory (ROM), an internal HDD, an external HDD, or a universal serial bus (USB) memory may be employed.

Figure 3:
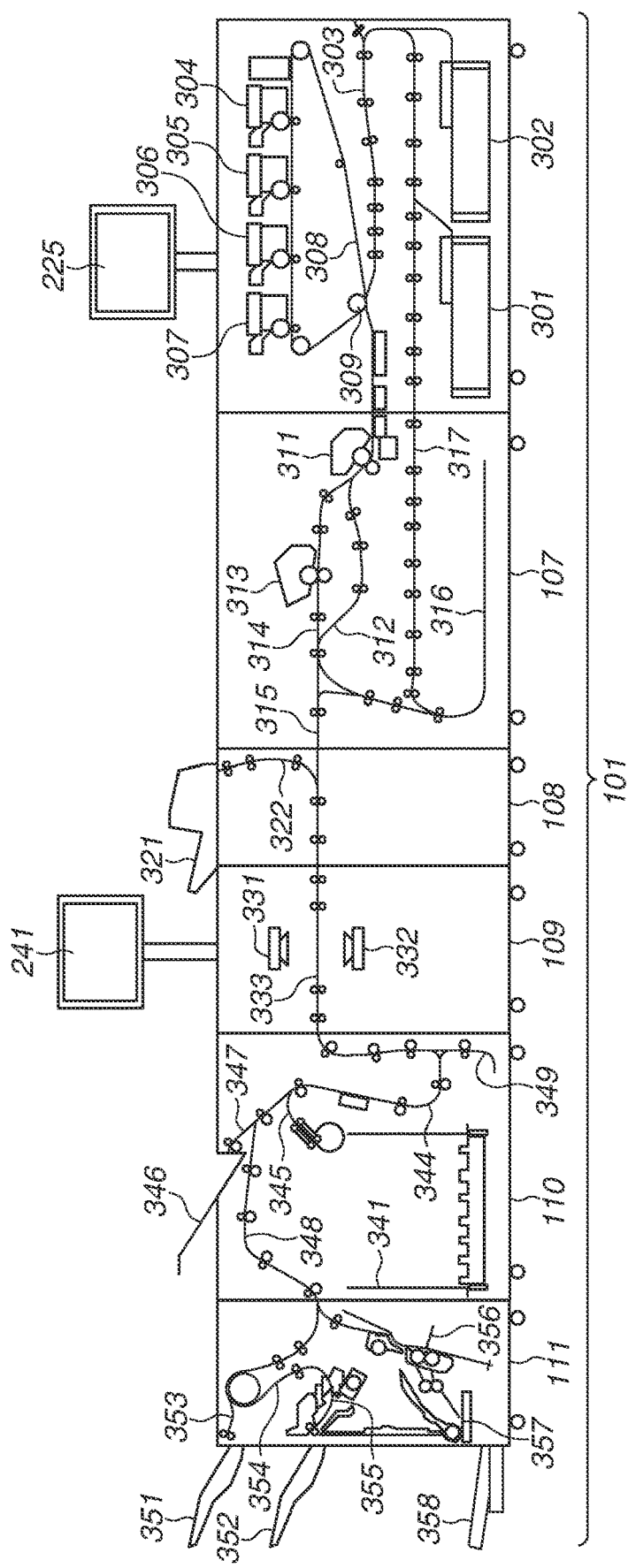
FIG. 3 is a cross-sectional diagram of an image forming apparatus.

FIG. 3 is a cross-sectional diagram of a mechanism of the image forming apparatus 101. The printing apparatus 107 is an apparatus that forms an image to be printed on a sheet. Sheet feeding decks 301 and 302 can store various sheets. Information regarding sheets stored in each sheet feeding deck (sheet size, sheet type) can be set from the operation unit 224 of the printing apparatus 107.

In each sheet feeding deck, only one uppermost sheet of stored sheets is separated and conveyed to a sheet conveyance path 303. To form a color image, development stations 304 to 307 form toner images using yellow (Y) colored toner, magenta (M) colored toner, cyan (C) colored toner, and black (K) colored toner, respectively. The toner images formed by the development stations 304 to 307 are primarily transferred to an intermediate transfer belt 308, and the intermediate transfer belt 308 rotates clockwise in FIG. 3. The toner images are transferred at a secondary transfer position 309 to a sheet conveyed from the sheet conveyance path 303.

The display 225 displays a printing status of the image forming apparatus 101 and information for the setting of the image forming apparatus 101. A fixing unit 311 fixes a toner image to a sheet. The fixing unit 311 includes a pressure roller and a heating roller, and fixes a toner image to a sheet by melting toner and applying pressure to the sheet while the sheet passes through between the rollers. The sheet having passed through the fixing unit 311 is conveyed to a sheet conveyance path 315 through a sheet conveyance path 312.

In a case where further melting and application of pressure are required for fixing depending on the type of sheet, after the sheet passes through the fixing unit 311, the sheet is conveyed to a second fixing unit 313 using an upper sheet conveyance path. After additional melting and application of pressure are performed in the second fixing unit 313, the sheet is conveyed to the sheet conveyance path 315 through a sheet conveyance path 314. In a case where an image forming mode is a two-sided mode, the sheet is conveyed to a sheet reversing path 316. After the sheet is reversed on the sheet reversing path 316, the sheet is conveyed to a two-sided conveyance path 317, and image transfer to the second surface is performed at the secondary transfer position 309.

The inserter 108 inserts an insertion sheet. The inserter 108 includes an inserter tray 321, and causes a sheet fed to the inserter tray 321 to join a conveyance path through a sheet conveyance path 322. With this configuration, a sheet can be inserted into a desired position in a series of sheets conveyed from the printing apparatus 107, and the series of sheets can be conveyed to a subsequent apparatus.

The sheet having passed through the inserter 108 is conveyed to the inspection apparatus 109. In the inspection apparatus 109, cameras 331 and 332 are arranged in such a manner as to face each other. The camera 331 is a camera for reading the top surface of a sheet, and the camera 332 is a camera for reading the bottom surface of the sheet. The inspection apparatus 109 can determine whether images on the sheet is normal by reading the images on the sheet using the cameras 331 and 332 at a timing at which a sheet conveyed to a sheet conveyance path 333 reaches a predetermined position. An inspection result obtained by the inspection apparatus 109 is displayed on the display unit 241.

The large-capacity stacker 110 is a large-capacity stacker on which a large number of sheets can be stacked.

The large-capacity stacker 110 includes a stack tray 341 as a tray on which sheets determined by the inspection apparatus 109 to be normal sheets (printed matters) are to be stacked. The sheet having passed through the inspection apparatus 109 is input into the large-capacity stacker 110 through a sheet conveyance path 344. The sheet is stacked on the stack tray 341 from the sheet conveyance path 344 via a sheet conveyance path 345.

The large-capacity stacker 110 further includes an escape tray 346 as a discharge tray. The escape tray 346 is a discharge tray used for discharging sheets determined by the inspection apparatus 109 to be sheets (printed matters) having errors. In a case where a sheet is output to the escape tray 346, the sheet is conveyed from the sheet conveyance path 344 to the escape tray 346 via a sheet conveyance path 347. In a case where a sheet is conveyed to a post-processing apparatus provided subsequent to the large-capacity stacker 110, the sheet is conveyed via a sheet conveyance path 348. A reversing unit 349 reverses a sheet. The reversing unit 349 is to be used in a case where a sheet is stacked on the stack tray 341.

In a case where a sheet is stacked on the stack tray 341 in such a manner that orientation of an input sheet and orientation of an output sheet become the same, the sheet is once reversed by the reversing unit 349. In a case where a sheet is conveyed to the escape tray 346 or the subsequent post-processing apparatus, because the sheet is discharged as-is without being flipped at the time of stacking, a reversing operation is not performed by the reversing unit 349.

The finisher 111 is an apparatus that adds finishing processing to a conveyed sheet based on a function designated by the user. Specifically, the finisher 111 has finishing functions such as stapling (stapling at one point or two points), punching (two holes or three holes), and saddle stitch bookbinding. The finisher 111 includes discharge trays 351 and 352. A sheet is output to the discharge tray 351 via a sheet conveyance path 353. On the sheet conveyance path 353, finishing processing such as stapling cannot be performed.

In a case where the finishing processing such as stapling is to be performed, a sheet is conveyed via a sheet conveyance path 354 to a processing unit 355, in which a finishing function designated by the user is executed, and the processed sheet is output to the discharge tray 352. The discharge trays 351 and 352 can be moved upward and downward. By moving the discharge tray 351 downward, the finisher 111 can stack a sheet on which the finishing processing has been performed in the processing unit 355 on the discharge tray 351. In a case where saddle stitch bookbinding is designated, after stapling processing is performed at the center of sheets by a saddle stitch processing unit 356, the sheets are folded into two, and the folded sheets are output to a saddle stitch bookbinding tray 358 via a sheet conveyance path 357. The saddle stitch bookbinding tray 358 has a belt conveyor configuration, and a saddle stitch bound bundle stacked on the saddle stitch bookbinding tray 358 is conveyed leftward in FIG. 3.

FIGS. 4A and 4B each illustrate an example of an automatic inspection result screen according to the present exemplary embodiment, which is displayed on the display unit 241. The automatic inspection result screen may be displayed on the display 225 of the printing apparatus 107 or the display 212 of the external controller 102.

FIG. 4A illustrates an example of a screen displaying an automatic inspection result list. An automatic inspection result list screen I400 includes an inspection result list I401, an environmental setting button I402, and an image diagnosis execution button I403 (instruction unit for issuing an image diagnosis instruction). The inspection result list I401 displays, as a list, results of inspection jobs registered as the inspection jobs. In each result list, a job name for identifying a job, a status indicating an execution status of an inspection job, an inspection start time, an inspection end time, the number of inspected sheets, and the number of failed sheets are displayed as a result of a corresponding inspection job. In addition, a setting confirmation link for transitioning to a screen for confirming a setting of a selected inspection job, a result confirmation link for transitioning to an inspection result confirmation screen I410, and an image diagnosis link for transitioning to a screen for executing image diagnosis in view of an inspection result (instruction unit for issuing an image diagnosis instruction) are also displayed together. In the result list, an inspected job that has already been inspected, and an uninspected job that has been set but has not yet been inspected are described. As for the inspected job, the status is displayed as "inspected", and the inspection start time, the inspection end time, the number of inspected sheets, and the number of failed sheets are described, and a link for transitioning to the inspection result confirmation screen I410 is displayed. If any sheet is determined as having failed in inspection as a result of the inspection, the image diagnosis link is displayed. As for an uninspected job, the status is displayed as "set", and undetermined values are displayed in other items. The environmental setting button I402 is a button for displaying an environmental setting screen of the system, and in a case where the environmental setting button I402 is selected, the automatic inspection result list screen I400 transitions to an image diagnosis environmental setting screen I500. The image diagnosis execution button I403 is a button for displaying an image diagnosis execution screen, and in a case where the image diagnosis execution button I403 is selected, the automatic inspection result list screen I400 transitions to an image diagnosis setting screen I600.

FIG. 4B illustrates an example of a screen to be displayed for inspection result confirmation. The inspection result confirmation screen I410 is a screen displaying details of an inspection result of a selected job when the result confirmation link of an inspected job in the inspection result list I401 is selected. FIG. 4B illustrates an example case where 16 sets of five-page print job is printed (80 pages in total), and two pages out of 80 pages have failed in inspection. The inspection result confirmation screen I410 includes an inspection failure thumbnail I411, an inspection summary result I412, a failed sheet list I413, an image diagnosis execution button I414, and a close button I415. In the inspection failure thumbnail I411, images read from the front surface and the back surface of a sheet failed in the inspection are displayed. In a case where a plurality of sheets has failed, by selecting a selection button provided below the thumbnail I411, images can be switched to images of another sheet failed in the inspection. The inspection summary result I412 is a region for displaying a summarized result of inspection results of an inspection job. In FIG. 4B, the inspection summary result I412 displays the number of inspected pages, the number of pages failed in the inspection, a failure percentage, the total number of error pages failed in printing or reading, and the total numbers of positional shift (vertical), positional shift (horizontal), dirt (point), and dirt (streak), which are defect factors in the inspection. In the failed sheet list I413, a page number in the entire inspection job, a page number in the print job, a set number, a surface number indicating a front surface or a back surface, an inspection result (passed or failed) of each failure factor, and an inspection date and time are described for each failed page, and a confirmation link for displaying a read image of a failed page is displayed. In a case where the failed image confirmation link is selected, a read image of a page failed in the inspection is displayed. The image diagnosis execution button I414 is a button for issuing an image diagnosis execution instruction. In a case where an image diagnosis execution instruction is issued, the inspection result confirmation screen I410 transitions to the image diagnosis setting screen I600. The close button I415 is a button for issuing an instruction to close the inspection result confirmation screen I410. If the close button I415 is selected, the inspection result confirmation screen I410 transitions to the automatic inspection result list screen I400 that had been displayed before transition.

Figure 5A:
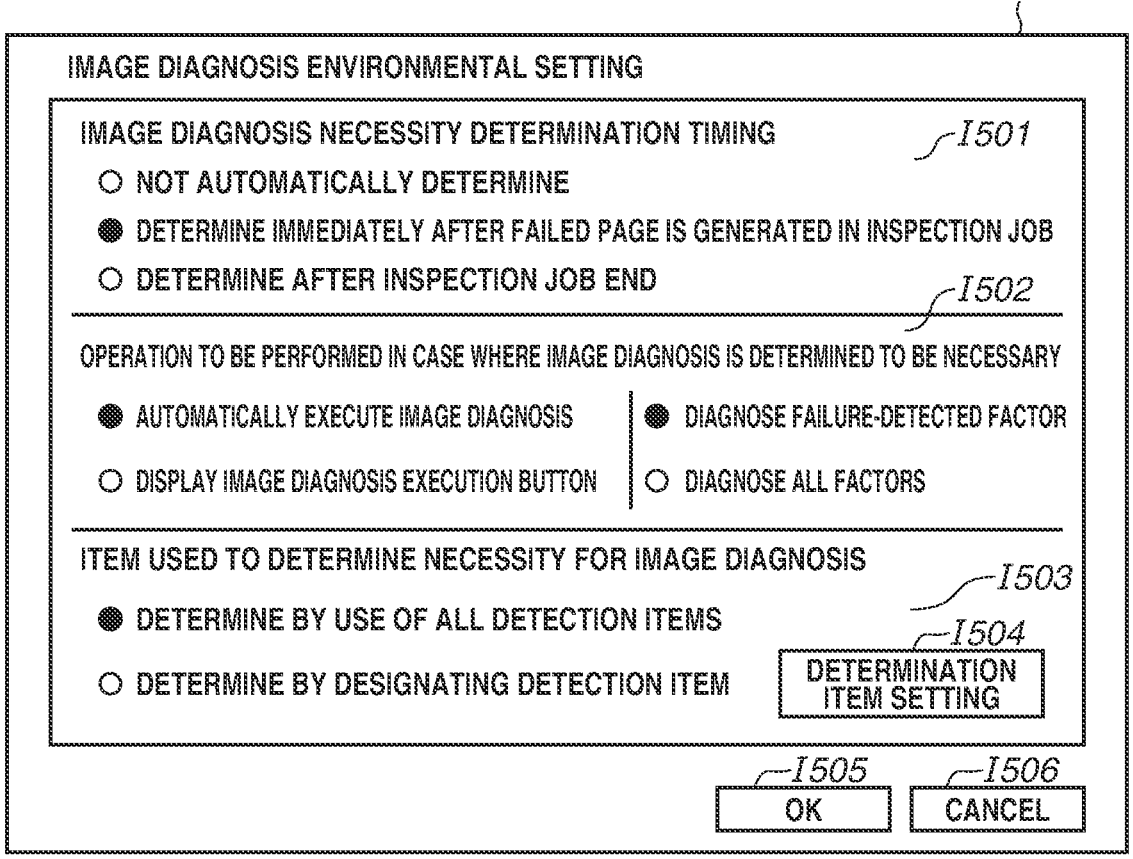

FIGS. 5A and 5B each illustrate an example of an image diagnosis environmental setting screen according to the present exemplary embodiment, which is displayed on the display unit 241 of the inspection apparatus 109. The image diagnosis environmental setting screen may be displayed on the display 225 of the printing apparatus 107 or the display 212 of the external controller 102. A setting selected on the image diagnosis environmental setting screen is stored in the HDD 256 of the inspection apparatus 109.

FIG. 5A illustrates an example of a screen to be displayed to make an image diagnosis environmental setting. The image diagnosis environmental setting screen I500 includes environmental setting items I501, I502, and I503 related to image diagnosis, a determination item setting button I504, an OK button I505, and a cancel button I506. The environmental setting item I501 is an item for setting an image diagnosis necessity determination timing. The setting of the image diagnosis necessity determination timing can be selected from among three options of "not automatically determine", "determine immediately after a failed page is generated in an inspection job", and "determine after an inspection job end". These three options are displayed by toggle indication, and a selected item is displayed in an emphasized manner. FIG. 5A illustrates an example of a screen on which the item of "determine immediately after a failed page is generated in an inspection job" is selected. In a case where inspection temporary suspension is selected, a numerical value indicating the number of pages failed in inspection in an inspection job that causes temporary suspension is settable.

The environmental setting item I502 is an item for setting an operation to be performed in a case where it is determined that image diagnosis is necessary when inspection has failed. In FIG. 5A, an option of automatically executing the image diagnosis, and an option of displaying an image diagnosis execution button are displayed by toggle indication. In addition, as an image diagnosis item, an option of diagnosing a failure-detected factor, and an option of diagnosing all factors are also displayed by toggle indication. The environmental setting item I503 is an item for setting an inspection item to be used in determining the necessity for image diagnosis. An option of determining the necessity for image diagnosis by use of all inspection items, and an option of determining the necessity by designating an inspection item to be used in determination are displayed by toggle indication. In a case where the option of determining the necessity by designating an inspection item to be used in determination is selected, the determination item setting button I504 becomes a selectable state. In a case where the option of determining the necessity for image diagnosis by use of all inspection items is selected, the determination item setting button I504 is displayed in a grayout state and is not selectable. In a case where the determination item setting button I504 is pressed, an image diagnosis necessity determination item setting screen I510 is displayed. In a case where the OK button I505 is pressed, a selected setting is stored in the HDD 256, and the image diagnosis environmental setting screen I500 is closed. In a case where a setting selected on the image diagnosis environmental setting screen I500 is not desired to be stored, the cancel button I506 is pressed, and the image diagnosis environmental setting screen I500 is closed.

FIG. 5B illustrates an example of a screen to be displayed to set an item for which the necessity for image diagnosis is to be determined. The image diagnosis necessity determination item setting screen I510 includes determination item settings I511, I512, and I513, an OK button I514, and a cancel button I515. The determination item settings I511, I512, and I513 are items for setting whether to determine the necessity for image diagnosis depending on a factor of a print defect when inspection has failed. The determination item setting I511 is an item for setting whether to execute image diagnosis in a case where an inspection result indicates a defect of a shift in image formation position with respect to a print medium. The determination item setting I512 is an item for setting whether to execute image diagnosis in a case where an inspection result indicates that a defect such as streaky dirt or an unprinted portion is generated in a read image. Depending on the generation factor, the streaky dirt or unprinted portion can be generated in a vertical direction and/or a horizontal direction with respect to a print result. In the example, streaks in both the vertical direction and the horizontal direction are targeted. The determination item setting I513 is an item for setting whether to execute image diagnosis in a case where an inspection result indicates that point-like dirt or an unprinted portion is generated in a read image. The determination item settings I511, I512, and I513 each include an option of diagnosing and an option of not diagnosing. In each item, the option of diagnosing and the option of not diagnosing are displayed by toggle indication. In a case where the determination item settings I511, I512, and I513 are set to the option of diagnosing, a target color to be diagnosed can be set. As the target color, colors used in image formation can be individually set. In the example, Y, M, C, and K toner colors can be individually set. Each toner color enters a selected state if being pressed once, and enters an unselected state if being pressed again. In a case where the OK button I514 is pressed, a selected setting is stored in the HDD 210, the image diagnosis necessity determination item setting screen I510 is closed, and the screen returns to the image diagnosis environmental setting screen I500. In a case where the setting selected on the image diagnosis necessity determination item setting screen I510 is not desired to be stored, the cancel button I515 is pressed, and the screen returns to the image diagnosis environmental setting screen I500.

FIGS. 6A, 6B, 6C, and 6D each illustrate an example of a screen related to an image diagnosis operation according to the present exemplary embodiment, which is displayed on the display unit 241. The image diagnosis environmental setting screen may be displayed on the display 225 of the printing apparatus 107 or the display 212 of the external controller 102.

FIG. 6A illustrates an example of a screen to be displayed to issue an image diagnosis execution instruction. The image diagnosis setting screen I600 includes image diagnosis target settings I601, I602, and I603, a sheet setting button I604, a diagnosis execution button I605, and a close button I606. The image diagnosis target settings I601, I602, and I603 are displayed to allow designation of a target factor for which image diagnosis is to be executed.

The image diagnosis target setting I601 can set whether to execute image diagnosis for a positional shift factor. The image diagnosis target setting I602 can set whether to execute image diagnosis for a dirt (streak) factor. The image diagnosis target setting I603 can set whether to execute image diagnosis for a dirt (point) factor. The image diagnosis target settings I601, I602, and I603 each include an option of diagnosing and an option of not diagnosing. In each item, the option of diagnosing and the option of not diagnosing are displayed by toggle indication. In a case where the image diagnosis target settings I601, I602, and I603 are set to the option of diagnosing, a target color to be diagnosed can be set. As the target color, colors used in image formation can be individually set. In the example, Y, M, C, and K toner colors can be individually set.

Each toner color enters a selected state if being pressed once, and enters an unselected state if being pressed again. The sheet setting button I604 includes a button for setting a sheet to be used in image diagnosis, and a description of setting contents.

If the sheet setting button I604 is selected, a sheet setting screen is opened, and a sheet to be used in image diagnosis can be set. The set sheet is described in the setting contents. FIG. 6A illustrates an example in which sheets are set for respective trays and A4-sized sheets in a tray 1 are in a selected state. If the diagnosis execution button I605 is pressed, an instruction to execute image diagnosis with the settings selected in the image diagnosis target settings I601, I602, and I603 and the sheet setting button I604 is issued. If the close button I606 is pressed, the image diagnosis setting screen I600 is closed without the image diagnosis being executed, and the display is switched to the screen that had been displayed before transition.

FIGS. 6B, 6C, and 6D each illustrate an example of a screen to be displayed to indicate an image diagnosis execution result. An image diagnosis result screen I610 in FIG. 6B is a screen to be displayed in a case where an image diagnosis result is normal, and includes diagnosis date and time I611, a result I612 for each diagnosis item, an image diagnosis result I613, and a close button I614. The diagnosis date and time I611 indicate date and time on which image diagnosis is executed and a result thereof is determined. The result I612 for each diagnosis item indicates a detailed diagnosis result of each diagnosis item that is an image diagnosis target. For each diagnosis item, a detailed result for each diagnosis item is displayed based on an item set in the image diagnosis target settings I601, I602, and I603. A result for each diagnosis item is displayed, and any of "normal", "abnormal", "to be automatically corrected", and "-" indicating an item is not an image diagnosis target is displayed as a result. The image diagnosis result I613 is a field for displaying a result of image diagnosis in view of the result I612 for each diagnosis item. In the example, a message is displayed by use of specific wording in such a manner as to be interpretable by the user. If the close button I614 is pressed, the image diagnosis result screen I610 is closed, and the display is switched to the screen that had been displayed before transition.

An image diagnosis result screen I620 in FIG. 6C is an example of a screen to be displayed in a case where a print defect attributed to a positional shift is detected as an execution result of image diagnosis, and the positional shift is automatically corrected. In the result I612 for each diagnosis item, "automatically corrected" is displayed for vertical and horizontal positional shift items that are automatic correction target items. In the image diagnosis result I613, contents of automatic correction are displayed.

An image diagnosis result screen I630 in FIG. 6D is an example of a screen to be displayed in a case where an abnormality is detected for a vertical streak item of dirt (streak) items as an execution result of image diagnosis. In the result I612 for each diagnosis item, "abnormal" is displayed for a vertical streak item of dirt (streak) items, for which an abnormality has been detected. In the image diagnosis result I613, in addition to the diagnosis item for which the abnormality has been found, a cause of the abnormality and a measure are displayed.

In the present exemplary embodiment, in a case where image defects in images on a plurality of sheets are detected by the inspection apparatus 109, the necessity of image diagnosis is determined, and the image diagnosis is executed based on the determination. In a case where an image defect is detected, the inspection apparatus 109 detects a factor of the defect in a read image read by an image reading sensor (reading unit), and determines the necessity of image diagnosis based on a defect generation status in a corresponding print job and a usage status of a component in the printing apparatus 107.

Figure 7:
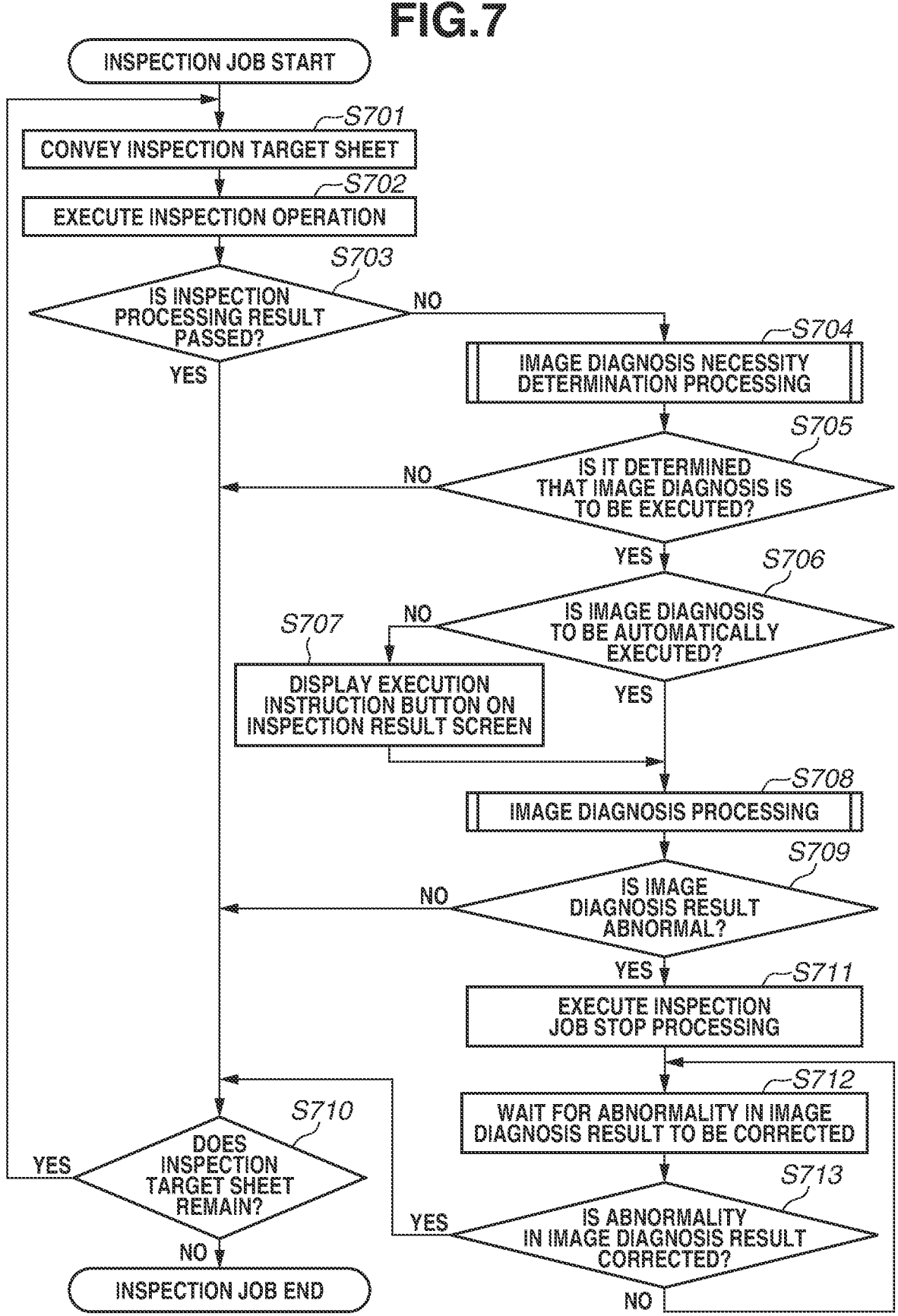
FIG. 7 is a flowchart illustrating processing of executing inspection and image diagnosis according to an exemplary embodiment.

FIG. 7 is a flowchart illustrating processing of executing image diagnosis subsequently to inspection processing. A series of processes in the flowchart are executed by the CPU 238 of the inspection apparatus 109 existing on the system. The processes in the inspection apparatus 109 are executed by the CPU 238 based on a control program read from the HDD 256 and loaded into the memory 239.

If the control program executed by the CPU 238 of the inspection apparatus 109 receives an inspection job execution start instruction from the user, a printing start instruction is issued from the external controller 102 to the printing apparatus 107. A recording sheet on which an image has been formed by the printing apparatus 107 is conveyed from the printing apparatus 107 to the inspection apparatus 109 via the inserter 108.

In step S701, the CPU 238 conveys a sheet on which an inspection target image is formed to a conveyance path.

In step S702, the CPU 238 executes an inspection operation by issuing an instruction to read the sheet using the image reading sensor (reading unit) in synchronization with a sheet conveyance timing. In the inspection operation, a read image is stored in the HDD 256, and whether an image defect is generated is determined as an inspection result. In a case where an image defect is generated, a factor of the image defect is determined and a determination result is recorded as an inspection result. The determined inspection results are recorded in the memory 239, and the processing proceeds to step S703.

In step S703, the CPU 238 determines whether an inspection result of inspection processing is "passed" or "failed". In a case where the inspection result is "passed" (YES in step S703), the processing proceeds to step S710. In a case where the inspection result is "failed" (NO in step S703), the processing proceeds to step S704.

In step S704, the CPU 238 executes image diagnosis necessity determination processing of determining the necessity for image diagnosis from the inspection result. The image diagnosis necessity determination processing will be described in detail with reference to FIG. 8.

If the processing is executed, determination on the necessity for image diagnosis ends, and a result is obtained, the processing proceeds to step S705.

In step S705, the CPU 238 checks whether the determination result of the necessity for image diagnosis indicates that image diagnosis is to be executed. In a case where it is determined that image diagnosis is to be executed (a predetermined condition for executing image diagnosis is satisfied) (YES in step S705), the processing proceeds to step S706. In a case where it is determined that image diagnosis is not to be executed (NO in step S705), the processing proceeds to step S710.

In step S706, the CPU 238 determines whether to automatically execute image diagnosis. The CPU 238 reads the environmental setting item I502 on the image diagnosis environmental setting screen I500 and recorded on the memory 239 that sets an operation to be performed in a case where it is determined that image diagnosis is necessary when a failure occurs, and determines whether to automatically execute image diagnosis. In a case where it is determined that image diagnosis is to be automatically executed (YES in step S706), the processing proceeds to step S708. In a case where it is determined that image diagnosis is not to be automatically executed (NO in step S706), the processing proceeds to step S707.

In step S707, the CPU 238 displays (performs display control of) a button for issuing an image diagnosis execution instruction (an instruction unit for issuing an image diagnosis instruction) on an inspection result screen displayed on the display unit 241. The inspection result screen according to the present exemplary embodiment corresponds to the automatic inspection result list screen I400 and the inspection result confirmation screen I410. On the automatic inspection result list screen I400, a diagnosis item field of a corresponding inspection job in the inspection result list I401, and the image diagnosis execution button I403 are enabled, and on the inspection result confirmation screen I410, the image diagnosis execution button I414 is enabled. If the button is displayed, and an instruction to execute image diagnosis processing is received, the processing proceeds to step S708.

In step S708, the CPU 238 executes the image diagnosis processing. The image diagnosis processing will be described in detail with reference to FIG. 9. If the processing is executed, image diagnosis ends, and a result is obtained, the processing proceeds to step S709.

In step S709, the CPU 238 determines whether a result of image diagnosis executed in step S708 indicates abnormal. In a case where the result of image diagnosis indicates abnormal (YES in step S709), the processing proceeds to step S711. In a case where no abnormality is generated (NO in step S709), the processing proceeds to step S710.

In step S710, the CPU 238 determines whether an inspection job is to be continued based on whether an inspection target sheet remains. In a case where an inspection target sheet remains (YES in step S710), the processing returns to step S701. In a case where no inspection target sheet remains (NO in step S710), the processing of the flow ends.

In step S711, the CPU 238 transmits an image formation stop notification indicating an inspection job stop to the CPU 222 of the printing apparatus 107, and the processing proceeds to step S712.

In step S712, the CPU 238 waits for the user to execute an operation for correcting an abnormality in an image diagnosis result. In this step, in a case where a notification indicating that an operation has been performed by the user is received from the CPU 222 of the printing apparatus 107, or an operation is performed on the operation unit 242 of the inspection apparatus 109, it is determined that the operation has been performed by the user, and the processing proceeds to step S713. The operation to be performed by the user in this step includes execution of component replacement or component cleaning of the printing apparatus 107, and manipulation or change of component information, which are to be executed to eliminate a cause for the abnormality in an image diagnosis result.

In step S713, the CPU 238 checks whether the abnormality in an image diagnosis result has been corrected by the user operation performed in step S712. For example, in a case where a procedure for correcting the abnormality in an image diagnosis result is to execute component replacement, in a case where the printing apparatus 107 detects that a corresponding component has been replaced and transmits a notification indicating that the component has been replaced, or the user notifies that the component has been replaced, it is determined that the abnormality has been corrected. In a case where the abnormality in an image diagnosis result has been corrected in this step (YES in step S713), the processing proceeds to step S710. In a case where the abnormality in an image diagnosis result has not been corrected in this step (NO in step S713), the processing returns to step S712.

Figure 8:
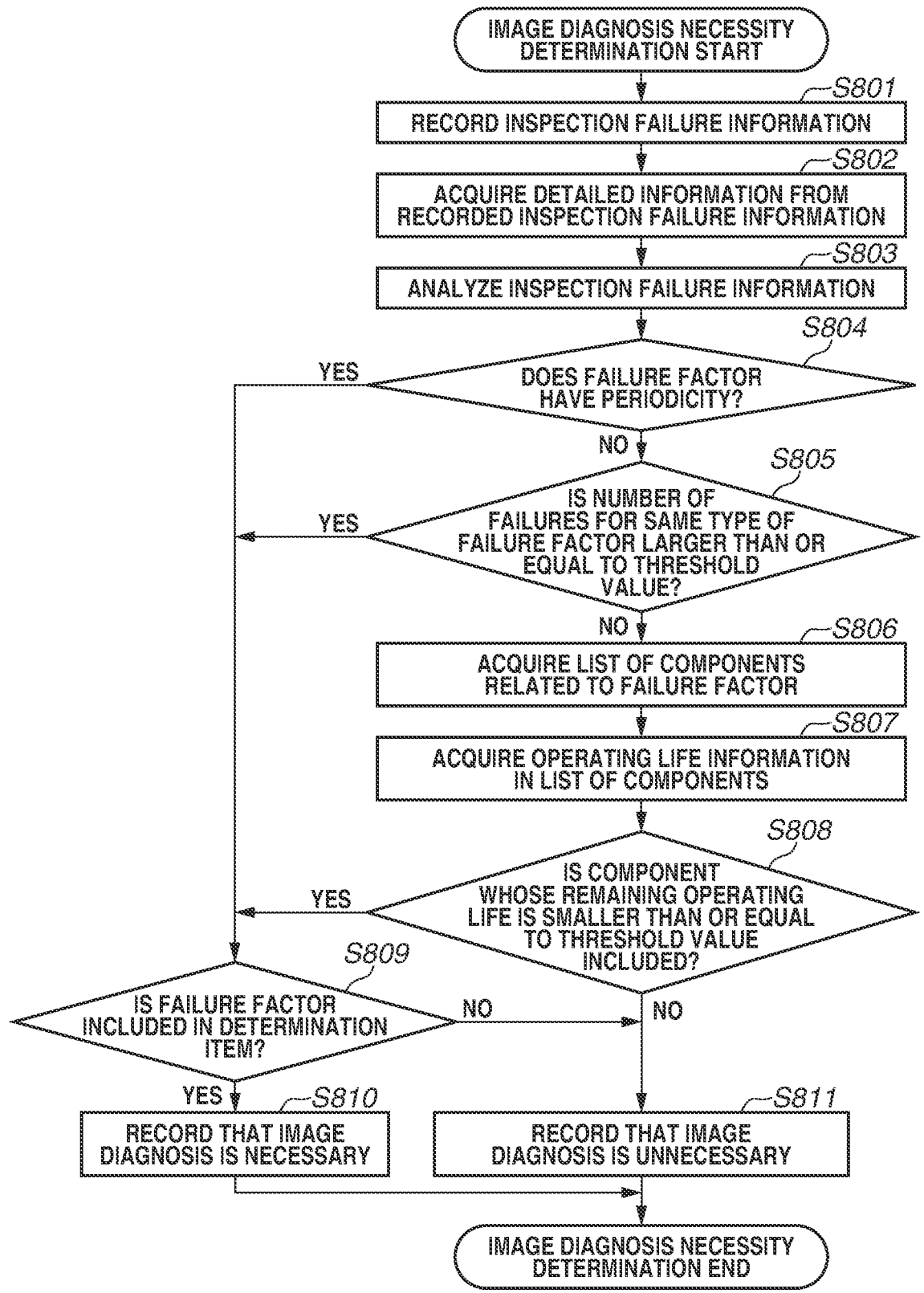
FIG. 8 is a flowchart illustrating processing of executing image diagnosis necessity determination according to an exemplary embodiment.

FIG. 8 is a flowchart illustrating the image diagnosis necessity determination processing according to the present exemplary embodiment that is executed in step S704 of FIG. 7. The series of processes is executed by the CPU 238 of the inspection apparatus 109 based on a control program read from the HDD 256 and loaded into the memory 239.

In step S801, the CPU 238 records an inspection result that has been recorded in step S702, in the memory 239 as inspection failure information, and the processing proceeds to step S802. The inspection failure information recorded in this step includes inspection failure information regarding a failure that has occurred so far, as a history.

In step S802, the CPU 238 reads the inspection failure information recorded in step S801, and acquires detailed information regarding a recorded inspection failure. In this step, as detailed information regarding the inspection failure, the type (point, streak, positional shift) of failure and the occurrence position of the failure are acquired. Once the detailed information is acquired, an acquisition result is recorded in the memory 239, and the processing proceeds to step S803.

In step S803, the CPU 238 executes processing of analyzing the detailed information regarding the inspection failure acquired in step S802. In this step, the CPU 238 performs analysis for determining whether failures due to the same failure factor have occurred, and analysis of occurrence frequency and periodicity of the failure factor by checking the inspection failure against an occurrence pattern of each failure factor. For example, if an image defect of the same type is generated at the same position in a main scanning direction, the image defect is determined to be a defect due to the same failure factor. If an image defect such as a point or a streak is periodically generated in a sub scanning direction, the image defect is determined to be a defect due to the same failure factor. For example, as for determination of periodicity, in a case where the inspection failure due to the same inspection failure factor occurs every given number of printed sheets, or in a case where it is determined that a dirt (streak) or a dirt (point) is generated every constant distance based on a size of a print sheet and an interval between conveyed print sheets, for example, it is determined that a periodic failure occurs. If the number of failures due to the same failure factor indicated by a determination result and a determination result indicating the periodicity of each failure factor are obtained as an analysis result of the detailed information regarding the inspection failure, the obtained information is recorded in the memory 239 as an analysis result, and the processing proceeds to step S804.

In step S804, the CPU 238 reads the analysis result recorded in step S803, and checks whether it is determined that a failure factor has periodicity. In a case where it is determined that a failure factor has periodicity (YES in step S804), the processing proceeds to step S809. In a case where it is determined that a failure factor does not have periodicity (NO in step S804), the processing proceeds to step S805.

In step S805, the CPU 238 reads the analysis result recorded in step S803, and performs determination using the number of failures for each failure factor and a threshold value. As the threshold value of the number of failures for each failure factor, a value set on a control program may be used, or a setting item may be provided as an item settable by the user, and a setting of the threshold value may be received from the user and used. In a case where the number of failures for the same type of failure factor is larger than or equal to the threshold value (YES in step S805), the processing proceeds to step S809. In a case where the number of failures for the same type of failure factor is smaller than the threshold value (NO in step S805), the processing proceeds to step S806.

In step S806, the CPU 238 reads the analysis result recorded in step S803, and acquires a failure factor of a failure that has occurred. Then, the CPU 238 reads a list of related components that may be a generation factor of the failure of the failure factor, from the HDD 256, and acquires a list of components affecting the failure factor by identifying related components from the failure factor. If the list of components affecting the failure factor is acquired, the processing proceeds to step S807.

In step S807, the CPU 238 issues an instruction to acquire operating life information in the list of components affecting the failure factor that has been acquired in step S806, to the CPU 222 of the printing apparatus 107. In this step, operating life information of all components may be acquired from the printing apparatus 107 and only operating life information of targeted related components may be read, or operating life information of a designated related component may be individually acquired. If the acquisition of the operating life information of the related components ends, the processing proceeds to step S808.

In step S808, the CPU 238 determines whether a component of which remaining operating life is smaller than or equal to a threshold value is included in the list of components from which the operating life information of related components has been acquired in step S807. Some component may be continuously used exceeding its operating life in some cases, and in such cases, determination is made to handle the remaining operating life as zero. In a case where a component of which remaining operating life is smaller than or equal to the threshold value is included (YES in step S808), the processing proceeds to step S809. In a case where a component of which remaining operating life is smaller than or equal to the threshold value is not included (NO in step S808), the processing proceeds to step S811.

In step S809, the CPU 238 reads an image diagnosis necessity determination item setting set on the image diagnosis necessity determination item setting screen I510 from the HDD 256, and determines whether an inspection failure factor is set as a factor to be diagnosed in the read determination item setting. In a case where a failure factor of an inspection failure that has occurred is included in the determination item (YES in step S809), the processing proceeds to step S810. In a case where the failure factor of the inspection failure that has occurred is not included in the determination item (NO in step S809), the processing proceeds to step S811.

In step S810, the CPU 238 records that image diagnosis is necessary in the memory 239 as the necessity for image diagnosis. In addition, the CPU 238 also records, as an image diagnosis target factor, an item set as an item to be diagnosed in the image diagnosis necessity determination item read in step S809, among items recorded as inspection failure factors, from the inspection failure information. If the necessity for image diagnosis is recorded, the processing in the flowchart ends. The predetermined condition based on which image diagnosis is to be executed is a condition that the CPU 238 make positive determination in any of steps S804, S805, and S808, for example.

In step S811, the CPU 238 records that image diagnosis is unnecessary in the memory 239 as the necessity for image diagnosis, and ends the processing in the flowchart.

Figure 9:
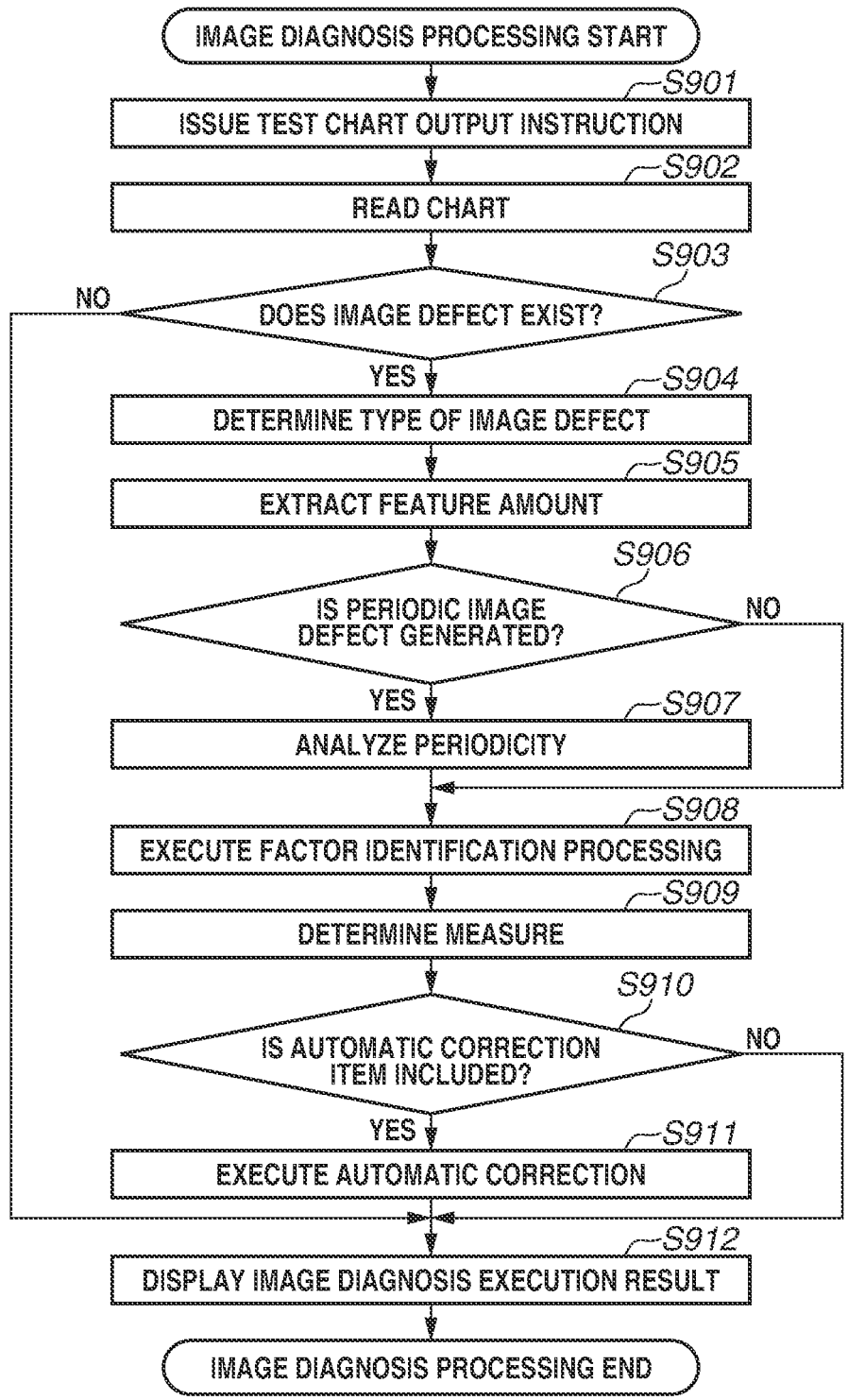
FIG. 9 is a flowchart illustrating processing of executing image diagnosis according to an exemplary embodiment.

FIG. 9 is a flowchart illustrating the image diagnosis processing according to the present exemplary embodiment that is executed in step S708 of FIG. 7. The series of processes is executed by the CPU 238 of the inspection apparatus 109 based on a control program read from the HDD 256 and loaded into the memory 239.

In step S901, the CPU 238 issues a test chart output instruction to the CPU 222 of the printing apparatus 107. The output instruction issued in this step is determined based on a diagnosis item set on the image diagnosis setting screen I600, or a diagnosis item set when it is determined in step S706 that image diagnosis is to be automatically executed. For example, the CPU 238 performs an operation of issuing an instruction to print an individual test chart for each color designated in the diagnosis item. As image data to be output as the test chart, data stored in the HDD 221 of the printing apparatus 107 may be used, or data stored in the HDD 256 of the inspection apparatus 109 may be transmitted together with a print instruction. If a response of a test chart output start is received from the CPU 222 of the printing apparatus 107, the processing proceeds to step S902.

In step S902, the CPU 238 issues an instruction to read a conveyed sheet on which the test chart is output, using the image reading sensor in synchronization with a conveyance timing of the conveyed sheet. Because the number of test charts to be conveyed varies depending on the setting of the diagnosis item, reading processing is executed on the number of sheets corresponding to the number of test charts an output instruction of which has been issued in step S901. If a read result is recorded in the HDD 256, the processing proceeds to step S903.

In step S903, the CPU 238 checks whether an image defect exists in the image read in step S902. In this step, image defect existence determination may be similarly performed on all images read in step S902, or an image defect factor to be determined may be defined for each test chart adapted to the setting of the diagnosis item, and image defect existence determination corresponding to the test chart may be performed. In a case where it is determined that an image defect exists (YES in step S903), the processing proceeds to step S904. In a case where it is determined that an image defect does not exist (NO in step S903), the processing proceeds to step S912.

In step S904, the CPU 238 determines the type of image defect in the read image determined in step S903 to include an image defect. The image defect type determination to be performed in this step is processing of determining whether an image defect of a positional shift, a vertical streak, a horizontal streak, or dirt (point) is generated in the read image determined to include the image defect. As the image defect type determination to be performed in this step, the type may be determined based on whether a feature of each defect is generated in the read image, or based on a difference obtained by a comparison between a reference image of a test chart that is stored in the HDD 256 of the inspection apparatus 109 and the image read in step S902. Alternatively, a read image including the image defect may be determined one by one, and the type of generated image defect may be determined, or a plurality of read images may be collectively determined. As a determination result of the type of image defect, abnormal or normal is recorded for each type of image defect. If the type of image defect is determined, the processing proceeds to step S905.

In step S905, the CPU 238 executes processing of extracting a feature amount corresponding to the type of image defect from the read image. In a case where the type of image defect is a vertical streak, for example, a feature amount to be extracted in this step includes the position of the streak, the width of the streak, the number of streaks, and the periodicity of the streak. If the feature amount extraction ends, the extracted feature amount is recorded in the memory 239, and the processing proceeds to step S906.

In step S906, the CPU 238 determines whether a periodic image defect is generated based on the type of image defect determined in step S904 and the feature amount extracted in step S905. In a case where a periodic image defect is generated (YES in step S906), the processing proceeds to step S907. In a case where a periodic image defect is not generated (NO in step S906), the processing proceeds to step S908.

In step S907, the CPU 238 analyzes periodicity based on the type of image defect determined in step S904 and the feature amount extracted in step S905. For example, in a case where the type of image defect is a vertical streak, the positions and the number of generated streaks are read as the feature amount, and a generation interval is analyzed as a generation period of streaks. In a case where it is determined that streaks are periodic based on an analysis result of the generation interval of streaks, the generation interval is recorded in the memory 239 as an analysis result, and the processing proceeds to step S908.

In step S908, the CPU 238 executes identification processing of an image defect generation factor based on the type of image defect determined in step S904, the feature amount extracted in step S905, and the analysis result of periodicity in a case where it is determined that a periodic image defect is generated. For example, the image defect generation factor can be identified by selection of a corresponding generation factor from a correspondence table of a feature amount analyzed for each image defect type and a generation factor. If a generation factor is identified as a result of the identification processing of an image defect generation factor, the identified generation factor is recorded in the memory 239, and the processing proceeds to step S909.

In step S909, the CPU 238 reads the generation factor identified in step S908, and determines a measure for the generation factor. For example, a correspondence table indicating a generation factor and a measure for the generation factor is stored, and the measure is determined by selection of a measure associated with a generation factor. As the measure, for example, a measure such as component replacement, component cleaning, or automatic correction is determined depending on a generation factor. If the measure is determined, the processing proceeds to step S910.

In step S910, the CPU 238 determines whether the measure determined in step S909 includes an automatic correction item. In a case where an automatic correction item is included (YES in step S910), the processing proceeds to step S911. In a case where an automatic correction item is not included (NO in step S910), the processing proceeds to step S912.

In step S911, the CPU 238 determines contents of automatic correction to be executed as the automatic correction item of the measure determined in step S909. Then, the CPU 238 issues an automatic correction execution instruction to the CPU 222 of the printing apparatus 107. Then, if the CPU 238 receives an automatic correction execution completion notification from the CPU 222 of the printing apparatus 107, the CPU 238 records completion in the automatic correction item of the measure recorded in the memory 239, and the processing proceeds to step S912.

In step S912, the CPU 238 displays an image diagnosis execution result on the display unit 241. In the image diagnosis execution result, in a case where an image defect is not generated, it is determined that a diagnosis result is normal. In a case where an image defect is generated, depending on image defect type determination, a diagnosis item for which a defect is not generated is determined to be normal, and a diagnosis item for which a defect is generated is determined to be abnormal. In a case where it is determined that the diagnosis result is abnormal and automatic correction thereof is executed, it is determined that automatic correction has been performed. As a result for each diagnosis item, the result obtained by the determination is displayed. Then, in a case where an abnormal diagnosis item exists, it is determined that an abnormality exists, and a diagnosis result and a cause thereof are described in the image diagnosis result I613. In a case where automatic correction has been performed, an automatically-corrected item is described in the image diagnosis result I613. In a case where only a normal diagnosis item exists, a diagnosis result indicating normal is described in the image diagnosis result I613. If the image diagnosis result screen is displayed on the display unit 241, the processing in this flowchart ends.

In the above-described exemplary embodiment, in a case where an image defect is generated and detected in inspection, the user can execute image diagnosis processing for identifying a factor depending on the factor of the generated image defect. With this configuration, the user can automatically solve an issue caused in a case where an image defect is generated, and can execute factor identification processing only for an image defect issue that requires the processing.

In the present exemplary embodiment, control programs of inspection and image diagnosis are executed on the CPU 238 of the inspection apparatus 109. Alternatively, an image read by the inspection apparatus 109 may be transmitted to the printing apparatus 107, the external controller 102, or the PC 103, and a transmission destination apparatus may execute the control programs.

In the exemplary embodiment of the present invention, on an inspection result screen indicating whether an image defect is generated in an image, whether to execute image diagnosis processing can be selected according to an instruction from the user.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. An inspection apparatus connected with an image forming apparatus, the inspection apparatus comprising:

a scanner configured to obtain inspection target image data by reading a printed matter printed on a recording sheet by the image forming apparatus based on a print job; and a controller having a processor which executes instructions stored in a memory, the controller being configured to:

inspect whether an image defect is in the inspection target image data obtained by the scanner; and execute, based on detecting the image defect from the inspection target image data, an image diagnosis of diagnosing a defect portion of the image forming apparatus based on a type of the image defect included in the inspection target image data, wherein the controller sets at least one setting regarding the image diagnosis, wherein the setting includes a setting regarding execution of the image diagnosis, and the setting regarding execution of the image diagnosis is one of a setting to automatically execute the image diagnosis and a setting to execute the image diagnosis upon receiving an instruction to execute the image diagnosis.

2. The inspection apparatus according to claim 1, wherein the controller diagnoses the defect portion of the image forming apparatus based on image data of a plurality of pages obtained by reading executed by the scanner.

3. The inspection apparatus according to claim 1, wherein the controller performs processing of diagnosing the defect portion of the image forming apparatus for an item of the image defect.

4. The inspection apparatus according to claim 1, wherein the image diagnosis is processing of identifying a generation factor of the image defect.

5. The inspection apparatus according to claim 1, wherein the image diagnosis is processing of identifying a component related to an image formation unit that serves as a generation factor of the image defect.

6. The inspection apparatus according to claim 1, wherein the setting includes a setting to determine whether the image diagnosis is necessary or not.

7. The inspection apparatus according to claim 6, wherein a setting as to whether to execute the image diagnosis or not is one of a setting not to automatically determine whether the image diagnosis is necessary or not, a setting to determine whether the image diagnosis is necessary or not in accordance with detecting the image defect, and a setting to determine whether the image diagnosis is necessary or not after an inspection corresponding to the print job ends.

8. The inspection apparatus according to claim 1, wherein the setting includes a setting to determine a type of the image defect in executing the image diagnosis.

9. The inspection apparatus according to claim 1, wherein a setting to determine a type of the image defect in executing the image diagnosis is one of a setting to execute the image diagnosis for all of a first type indicating a positional shift, a second type indicating a dirt by a streak, and a third type indicating a dirt by a point and a setting to execute the image diagnosis for a designated type among the first, second, and third types.

10. The inspection apparatus according to claim 1, wherein the image diagnosis is executed based on the setting.

11. A control method of an inspection apparatus connected with an image forming apparatus, the inspection apparatus including a scanner, the control method comprising:

obtaining, by the scanner, inspection target image data by reading a printed matter printed on a recording sheet by the image forming apparatus based on a print job;

inspecting whether an image defect is in the inspection target image data obtained by the scanner;

executing, based on detecting the image defect from the inspection target image data, an image diagnosis of diagnosing a defect portion of the image forming apparatus based on a type of the image defect included in the inspection target image data; and setting at least one setting regarding the image diagnosis, wherein the setting includes a setting regarding execution of the image diagnosis, and the setting regarding execution of the image diagnosis is one of a setting to automatically execute the image diagnosis and a setting to execute the image diagnosis upon receiving an instruction to execute the image diagnosis.

12. The control method according to claim 11, wherein the defect portion of the image forming apparatus is diagnosed based on image data of a plurality of pages obtained by the scanner.

13. An inspection system including an image forming apparatus, the inspection system comprising:

a scanner configured to obtain inspection target image data by reading a printed matter printed on a recording sheet by the image forming apparatus based on a print job; and a controller having a processor which executes instructions stored in a memory, the controller being configured to:

inspect whether an image defect is in the inspection target image data obtained by the scanner;

execute, based on detecting the image defect included in the inspection target image data by the inspecting, an image diagnosis of diagnosing a defect portion of the image forming apparatus based on a type of the image defect included in the inspection target image data; and set at least one setting regarding the image diagnosis, wherein the setting includes a setting regarding execution of the image diagnosis, and the setting regarding execution of the image diagnosis is one of a setting to automatically execute the image diagnosis and a setting to execute the image diagnosis upon receiving an instruction to execute the image diagnosis.

14. The inspection system according to claim 13, wherein the controller diagnoses the defect portion of the image forming apparatus based on image data of a plurality of pages obtained by reading executed by the scanner.

15. The inspection system according to claim 13, wherein the setting includes a setting to determine whether the image diagnosis is necessary or not.

16. The inspection system according to claim 15, wherein a setting as to whether to execute the image diagnosis or not is one of a setting not to automatically determine whether the image diagnosis is necessary or not, a setting to determine whether the image diagnosis is necessary or not in accordance with detecting the image defect, and a setting to determine whether the image diagnosis is necessary or not after an inspection corresponding to the print job ends.

17. The inspection system according to claim 13, wherein the setting includes a setting to determine a type of the image defect in executing the image diagnosis.

18. The inspection system according to claim 13, wherein a setting to determine a type of the image defect in executing the image diagnosis is one of a setting to execute the image diagnosis for all of a first type indicating a positional shift, a second type indicating a dirt by a streak, and a third type indicating a dirt by a point and a setting to execute the image diagnosis for a designated type among the first, second, and third types.

19. The inspection system according to claim 13, wherein the image diagnosis is executed based on the setting.

* * * * *